United States Patent
Vind

[15] 3,656,276
[45] Apr. 18, 1972

| [54] | METHOD AND APPARATUS FOR SUPPLYING AIR |
|---|---|
| [72] | Inventor: Harold P. Vind, Oxnard, Calif. |
| [73] | Assignee: The United States of America as represented by the Secretary of the Navy |
| [22] | Filed: Jan. 10, 1967 |
| [21] | Appl. No.: 608,454 |
| [52] | U.S. Cl. ...........................55/46, 55/206, 128/145 R |
| [51] | Int. Cl. ......................B01d 19/00, A62b 07/00 |
| [58] | Field of Search ...............128/140, 142, 145.1, 147; 55/38, 42, 41, 16, 46, 206 |

[56] References Cited

UNITED STATES PATENTS

| 2,050,771 | 8/1936 | Wait | 210/63 X |
| 1,530,598 | 3/1925 | Gibson | 55/42 |
| 3,228,394 | 1/1966 | Ayres | 128/147 |
| 3,318,306 | 5/1967 | Strauss | 128/142 |
| 3,333,583 | 8/1967 | Bodell | 128/142 |
| 3,369,343 | 2/1968 | Robb | 55/16 |
| 3,377,777 | 4/1968 | Isomura | 55/42 |

Primary Examiner—Dalton L. Truluck
Attorney—R. S. Sciascia and P. N. Critchlow

[57] ABSTRACT

The invention is a method and apparatus for supplying air from water comprising the steps of and elements for any of the following: mixing stale air and water in intimate and agitated contact and then separating the resulting air and water, or bubbling stale air through the water and then removing the resulting air, or boiling the water and then removing the air driven off, or reducing the pressure upon the water and then removing the air given off.

3 Claims, 5 Drawing Figures

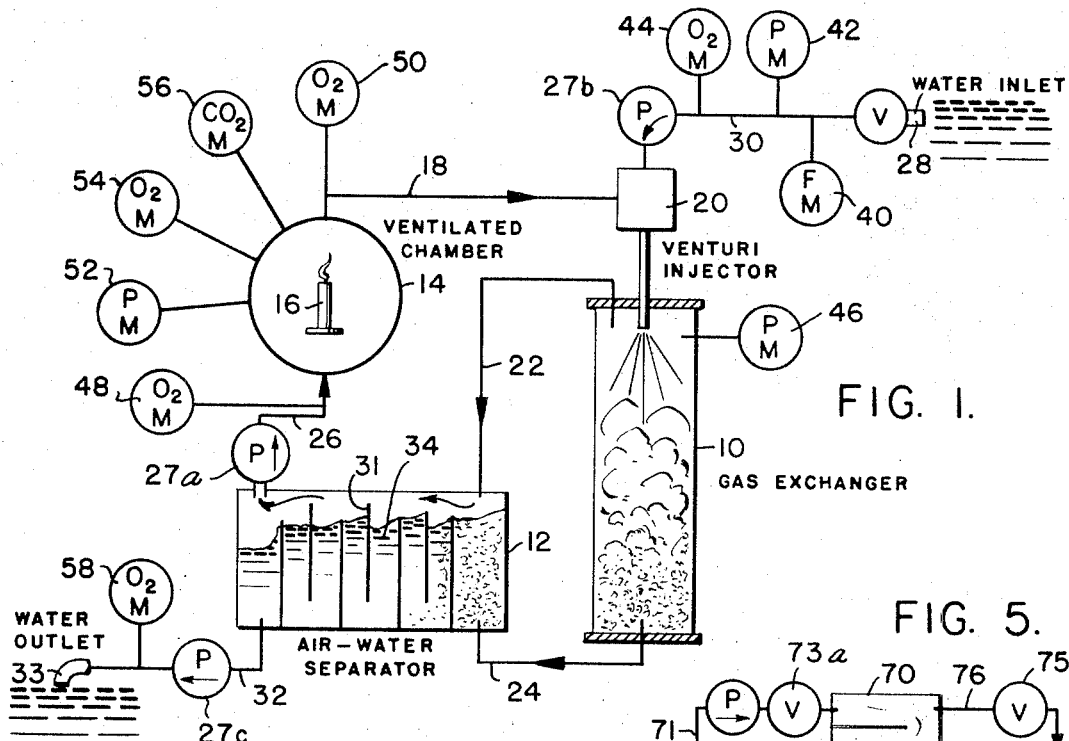
FIG. 1.
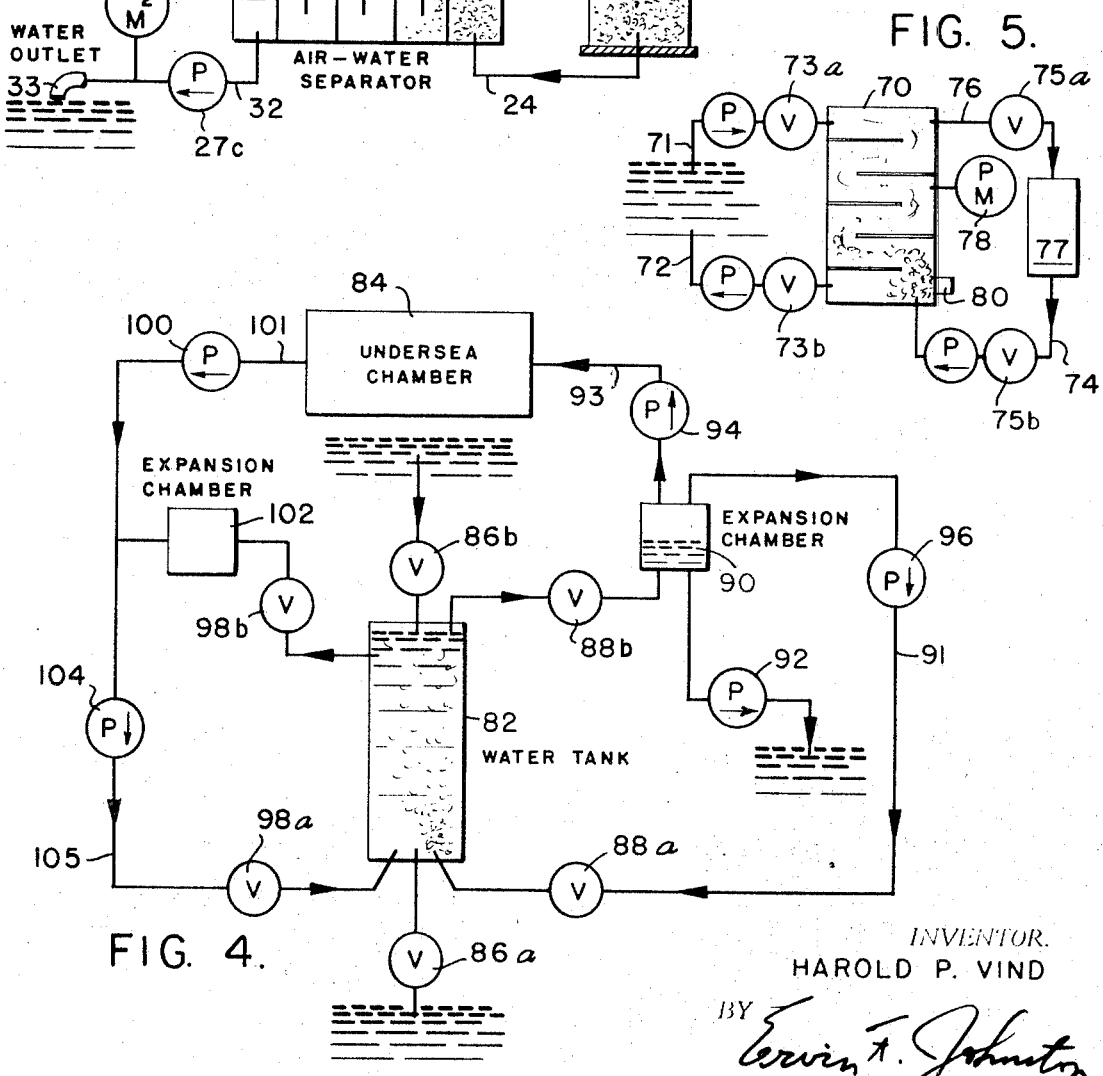
FIG. 5.
FIG. 4.
INVENTOR.
HAROLD P. VIND

INVENTOR.
HAROLD P. VIND
ATTORNEY.

METHOD AND APPARATUS FOR SUPPLYING AIR

BACKGROUND OF THE INVENTION

1. Field of the Invention

This invention relates to a new and unique method and apparatus for supplying air, and more particularly, this invention relates to a method and apparatus for supplying air from water by removing dissolved oxygen from the water and a method and apparatus for disposing of stale air by discharging carbon dioxide and other waste gases to the water.

2. Description of the Prior Art

Throughout history man has had a desire to imitate the fish in their undersea freedom of movement and their independence from the above sea atmosphere. Recently these dreams have taken great steps toward realization. Dr. Walter L. Robb, a scientist at the General Electric Research Laboratory, has recently invented a thin silicone rubber membrane which permits the passage of gases but does not allow the passage of water. Since sea water contains dissolved oxygen and since sea water has the ability to dissolve carbon dioxide, oxygen depleted air within an enclosed chamber may be replenished by the oxygen dissolved within the sea water, while excessive carbon dioxide within the chamber may be diffused through the membrane into the sea water. Recent experiments by General Electric have shown that a hampster can be kept alive for periods of up to two weeks in a submerged chamber using a thin silicone rubber membrane. The advantages of such a membrane are its physical simplicity and its related small power requirements; sea water is merely circulated past the membrane without requiring any pumping against great pressure differentials.

However, there are certain disadvantages which arise when using membranes; first, requiring the gases to diffuse through a membrance is a slow process no matter how thin the membrane. For example, even a mono-molecular film of oil on a surface of water markedly retards evaporation. Second, the membrane system requires that there be a pressure differential across the membrane because it is desirable that the chamber pressure be below that of atmosphere pressure whereas the surrounding sea pressure will be above one atmosphere pressure. While scientists have succeeded in strengthening the membrane by backing it with a porous membrane, there is always the danger that the rather fragile framework will break and permit the entrance of sea water. Third, there is a practical maximum partial pressure of oxygen that can be maintained in the chamber, about 100 mm of mercury. This is barely life sustaining and is certainly not a comfortable oxygen pressure for divers who prefer oxygen pressures of 160 mm to 300 mm of mercury. Fourth, where a chamber is not maintained at the surrounding water pressure divers cannot freely enter or leave the chamber through a water-air interface but must go through pressure locks.

U.S. Pat. No. 3,228,394 to W. A. Ayres discloses a gill type underwater breathing apparatus and a method for reoxygenating exhaled breath in which he requires no pressure differential across his membrane. However, certain disadvantages persist even in this type of equipment in that while it is shown to be successful at or very near the surface of water, such a device would not operate very well at any depth beyond shallow water. In an article which appeared in the magazine "Mechanical Engineer", Aug. 1966, Clinton E. Brown stated that another gas is necessary in the system to balance the hydrostatic pressure of the water. Because oxygen has a partial pressure of 0.2 atmospheres (carbon dioxide has a negligible partial pressure), at a depth of 100 ft. where the hydrostatic pressure is approximately 3.8 atmospheres the other gas must have a partial pressure of 3.6 atmospheres. Since the partial pressure of any specific gas in sea water is no greater than 0.8 atmospheres (nitrogen) a strong tendency would exist due to the large pressure differential, for this gas to diffuse into the water. Therefore, the gilled scuba system is limited to depths where the other gas would have less of a consumption problem than oxygen. Brown made a rough calculation and figured that these depths would be any depth above 2 feet, therefore making the device impractical for most uses. At all depths air from inside the face mask or ventilated chamber would diffuse into the surrounding ocean water more rapidly than dissolved air in the ocean water would diffuse back into the chamber. I calculated that at a depth of 10 feet diffusion of air outward will occur at a rate of about 130 percent of diffusion inward; at a depth of 33 feet the rate would be 200 percent; and at a depth of 66 feet the rate would be 300 percent. At any depth below 30 feet a diver would be better off with a scuba tank without the gill than with the gill as the gill would deplete the compressed air tank in a very brief period of time.

SUMMARY OF THE INVENTION

Thus, while much progress has been made in man's search for an acceptable process and apparatus to allow ultimate freedom and sustainability underwater, not all of the myriad of problems have been solved. The present invention carries the state-of-the-art into the next generation of process and equipment necessary to easily sustain life underwater. The present invention solves the problems of the prior art by disclosing a method and apparatus for supplying air comprising the steps of and elements for moving stale air to an oxygen extraction means, mixing water with the stale air to extract the oxygen from the water, and then separating the resulting water from the resulting reoxygenated air.

The mixing of water and stale air is known in the art as "scrubbing." The scrubbing process comprises washing the air by vigorously mixing it with water and then separating it from the water. Thus, by bringing the air and water into intimate and agitated contact, quick and simple gas exchange may occur which could not easily be done when a membrane, no matter how thin, is inserted between the two ingredients as was done in the prior art.

The basic physics principle involved in the process of extracting oxygen from sea water and dissolving waste gases in sea water is the phenomenum of partial pressures. To adapt the method and apparatus already disclosed for use at some ocean depth, it may be desirable to control the pressures in the chamber where mixing occurs and in the chamber in which habitation or oxygen consumption is to take place. It is usually desirable to have the habitation chamber at the same pressure as the surrounding sea (to allow easy entrance and exit). If the habitation chamber is at a pressure greater than one atmosphere, the percentage of oxygen for survival need not be as great as the normal 21 percent at one atmosphere pressure. Thus, the percentage (and the partial pressure) of the oxygen to be mixed with the water may be reduced. Because air and sea water are in contact only at the ocean surface, the total pressure of the dissolved gases in sea water is approximately one atmosphere at all depths. Therefore, the mixing chamber should be at a pressure no greater than one atmosphere if the partial pressure of oxygen in the air used for consumption is to be less than the partial pressure of oxygen in the sea water. If such is the case, then oxygen will flow from the area of high partial pressure to the area of low partial pressure. And if the mixing chamber is held at a pressure of one atmosphere or below there may be a net gain in the amount of air in the system which will make up for air lost as fine bubbles in the exhausted sea water and which may be used to operate air locks or charge scuba tanks.

An object of the present invention is to provide a method and apparatus for supplying air from water.

Another object of the invention is to provide an efficient method and apparatus for supplying air from water without the need for a membrane or the need for great expenditures of energy.

A further object of the invention is to provide a method and apparatus which is capable of supplying air from water at any depth in the sea and under various pressures as encountered underwater.

Another object of the present invention is to provide a method and apparatus for supplying air from water and also capable of disposing of waste gases such as carbon dioxide.

A still further object of the present invention is to provide a method and apparatus for reoxygenating stale air from an undersea vessel, chamber, work space or living space by extracting dissolved oxygen from the ambient water and by dissolving waste gases from said vessel, chamber or space in said ambient water.

Another object of the present invention is to provide method and apparatus for supplying air from water by either mixing stale air with the water or by reducing the pressure upon the water or by boiling the water.

DESCRIPTION OF THE DRAWINGS

FIG. 1 is a diagrammatic view of a preferred embodiment of the invention very similar to an experimental apparatus used.

FIG. 4 is a diagrammatic view of a second preferred embodiment of the invention for use in deep sea environments.

FIG. 5 is a diagrammatic view of a third and a fourth preferred embodiment of the invention.

DESCRIPTION OF THE PREFERRED EMBODIMENTS

Figure 2:
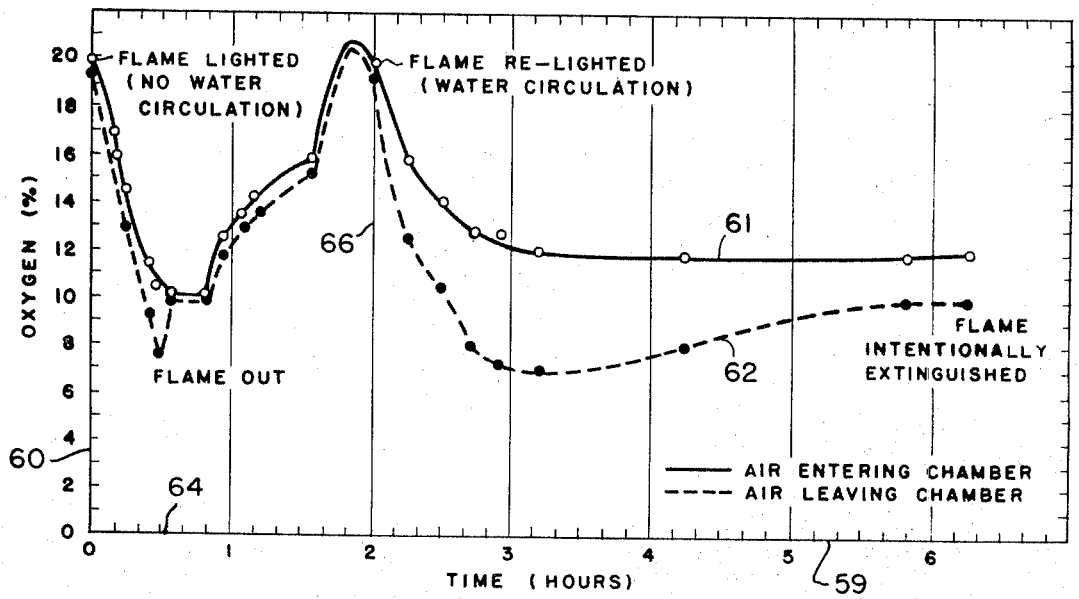
FIG. 2 is a graph depicting experimental results during a candle-flame experiment using an apparatus like that shown in FIG. 1.

Referring now to the drawings, wherein like reference numerals designate like or corresponding parts throughout the several views, there is shown in FIG. 1 an apparatus similar to one I used in an experiment to prove the correctness of my theory that oxygen which is dissolved in water can be removed and used for sustaining an oxygen consuming process or for sustaining life. The experimental unit basically comprised a means adapted to extract oxygen from water and a ventilated chamber in which the oxygen is consumed. The means adapted to extract oxygen from water may be comprised of a gas exchanger column 10 and an air-water separator 12 which takes stale air or a person's exhaled breath from a ventilated or habitation chamber 14 and reoxygenates it before conducting it back to the chamber 14. In one experiment the chamber 14 held a candle 16 as shown; in a second experiment two rats were placed within the chamber. It is noted that the chamber 14 may be any device to which oxygen is to be furnished, such as the interior portion of a submarine, or to the interior of an underwater living or working space. The air in the system may be circulated through the apparatus as follows: oxygen is used for breathing or otherwise consumed in ventilated chamber 14, the stale air is then discharged through conduit 18 to a venturi nozzle 20, into the gas exchanger column 10, then through conduit 22, and conduit 24 into the air water separator 12 before the resulting air is returned by way of conduit 26 through pump 27a to the ventilated chamber 14.

The water circuit in the experimental apparatus may be as follows: water inlet 28 receives water (which in the experiment was sea water containing dissolved oxygen) into conduit 30 through pump 27b to the venturi nozzle 20. The venturi nozzle may have a restricted throat so that water flowing from conduit 30 increases its velocity in the throat. The increased velocity of the water through the nozzle 20 creates a local low pressure region which is in communication with the conduit 18 through which the stale air from ventilated chamber 14 flows. The local low pressure area acts as a pump which draws the air from chamber 14 through conduit 18 into the venturi nozzle 20. As the water exits from the venturi nozzle into the gas exchanger column 10 it is a fine spray such that the stale air and the water are in intimate and agitated contact and in the form of a finely dispersed mixture of foam. Gas exchanger column 10 is filled with a spray and foam mixture where oxygen which is dissolved in the water is extracted and transferred from the water to the stale air and excessive carbon dioxide which is brought into the exchanger column by the stale air is extracted therefrom and transferred to the water and dissolved. Some oxygen which is separated in the gas exchanger column will be mixed with the stale air and may be conducted through conduit 22, through the air-water separator 12 and back to the ventilated chamber by way of conduit 26, or conduit 22 could be configured to conduct the air 26, directly to chamber 14.

The air which is part of the spray and foam mixture is passed through conduit 24 into the air-water separator 12 which may comprise a wide baffled tank so that the water passes over and under successive baffles 31 and is slowed before being discharged (by pump 27c) through conduit 32 and water outlet 33. During the movement of the water over and under the baffles in the air-water separator, the entrained air in the water will bubble to the water surface 34 and be conducted out of the separator as shown by the arrows through conduit 26 back to the ventilated chamber 14. The air which is being conducted back into chamber 14 has been reoxygenated and has had carbon dioxide extracted so that it is adapted to be used for life sustaining process one more; that is, the air is oxygen enriched and substantially purified.

The process just described as taking place in the gas exchanger column 10 and the air-water separator 12 is commonly known in the art as "scrubbing." The scrubbing process consists of washing the air by vigorously mixing it with sea water and then separating it from the water. During the scrubbing process excessive carbon dioxide in the stale air dissolves in the stream of sea water; oxygen dissolved in the sea water diffuses into the oxygen-poor stale air. Most of the process will generally occur within the gas exchanger column 10 where there is considerable agitation and there is intimate contact between the air and the water. It is noted that there are no artificial barriers such as membranes to retard the exchange of oxygen and carbon dioxide between the air and the water, a distinct advantage over the prior art. Before discharging the sea water, it passes through the baffled tank where any entrained air is recovered by bubbling it to the surface 34 and then passing it back to the ventilated chamber 14 for use.

The physics involved in the transfer of oxygen and carbon dioxide is quite simple and based upon the concept of partial pressures. In sea water, for example, air molecules are constantly bombarding the surface of the sea water and being dissolved while an equal number of air molecules are leaving the water to reenter the atmosphere. Therefore, at the surface of the ocean, at least, there is a total pressure of approximately 1 atmosphere of air dissolved within the sea water. Due to normal ocean currents these dissolved gases in the sea water are carried to the various ocean depths and generally circulated therethrough. If the total pressure of the dissolved air in sea water is approximately 1 atmosphere then the partial pressure of the individual gases within the air is approximately the same as in the atmosphere which we normally breath (such as oxygen which is approximately 0.21 atmospheres). Likewise, the carbon dioxide gas is at a partial pressure approximately equal to the partial pressure of carbon dioxide in the atmospheric air which we breath (which is less than 0.01 atmospheres pressure).

In a closed chamber 14, FIG. 1, the candle 16 is adapted to burn and consume oxygen. After a short period of time if new air was not allowed to circulate through the chamber, that air within the chamber would have its constituent gases altered so that there would be a lessening of oxygen and an increase of carbon dioxide with a corresponding increase in the carbon dioxide partial pressure and a corresponding decrease in the oxygen partial pressure. If the oxygen deficient, carbon dioxide enriched air is brought into contact with water containing dissolved oxygen, such as occurs in the gas exchanger column 10, then the oxygen dissolved in the sea water, because of its higher partial pressure than the partial pressure of the oxygen within the air, will have a tendency to extract itself from the water and flow to that area of lower pressure. Likewise, the carbon dioxide being at a higher partial pressure in the air than the carbon dioxide dissolved in the sea water will have a tendency to move from a higher pressure to a lower pressure thus causing the carbon dioxide to dissolve into the water. By causing a spray and a great agitation the surface area between the water and the air increases manyfold and allows the interchange to take place, the motive force of the interchange being the partial pressure phenomenom. Therefore, if the system is constantly bringing in fresh water from an outside source and recirculating the air from the ventilated chamber, a continuous process exists for reoxygenating the stale air, whether it be from the candle or from the breath of a man, and then transferring this new oxygen-enriched and substantially purified air or breath back to the chamber where the candle or person is situated.

During the actual experiment it was found that the candle 16 was able to burn within the ventilated chamber 14 for 31 minutes using only the oxygen that was available in the system when the candle was initially lit. The original water was circulated again and again through the system. When, however, fresh water was supplied at a rate of 30 liters per minute, and the candle relit, it was able to burn for a period of four hours and fifteen minutes before it was intentionally extinguished. All indications were that it would have otherwise burned continuously for an indefinite period of time. Hence it was proven that an oxygen consuming device could be sustained with oxygen derived from water. A later experiment using similar equipment with two rats placed within the ventilated chamber 14 showed that the oxygen derived from the sea water may actually sustain animal life. In one of the experiments the rats were maintained in the chamber for eight hours without apparent discomfort. The experiment was then ended and the rats were observed for ill effects — none were found. After two weeks the rats were reexamined and found to be in good health. In the foregoing experiments the oxygen was recovered from the sea water and was supplied to the rats (and to the flame) at a rate of approximately 0.1 liters per minute. It is, of course, realized that a man would need somewhat more oxygen supplied to him; this could be accomplished by changing either of two factors, (1) increasing the flow of water through the system, or (2) increasing the size of the system to allow for a greater interchange between the stale air and the circulating water.

Numerous instruments may be placed throughout the system as follows: at or near the water inlet 28 may be a flowmeter 40, a pressure meter 42 and an oxygen meter 44 to indicate the rate of flow, the water pressure at the inlet, and the percent of oxygen within the inlet respectively; a pressure meter may be maintained at 46 to indicate the pressure within the gas exchanger column and the water separator; an oxygen meter 48 may be maintained on conduit 26 to sample the air just prior to its entrance into the chamber 14 and another oxygen meter 50 may be located just outside the chamber 14 to indicate the concentration of oxygen in the air as it exits from the chamber; a pressure meter 52, an oxygen meter 54 and a carbon dioxide meter 56 may be attached to the ventilated chamber 14 to indicate the pressure in the chamber, the oxygen concentration within the chamber and the carbon dioxide concentration within the chamber respectively; finally, an oxygen meter 58 may be placed at the water outlet 33 to indicate the concentration of oxygen in the discharging sea water.

With regard to the oxygen meter 48, indicating the concentration of oxygen within the air prior to its entry into the ventilated chamber 14, and oxygen meter 50, indicating the concentration of oxygen as the air leaves the ventilated chamber, the experiment using the flame as the oxygen consuming device was conducted and the results plotted as shown in FIG. 2, wherein the abscissa 59 indicates the time of the experiment and the ordinate 60 indicates the concentration of oxygen within the system. Solid line 61 indicates the reading taken by oxygen meter 48 while dotted line 62 indicates the reading taken by oxygen meter 50. At time zero the candle was lit; outlet 33 was connected to inlet 28 and the water within the system was circulated again and again, the candle was allowed to burn and as shown by curve 61 and curve 62, the oxygen concentration began to drop rapidly until after 31 minutes (shown by point 64) the flame extinguished itself when the oxygen concentration of the exhausting air was less than 8 percent and the oxygen in the incoming air was about 10 percent (normal air containing just under 21 percent oxygen). The apparatus was then vented to the atmosphere and the water inlet opened to start an experiment with the apparatus functioning under intended conditions. New water was circulated. At approximately time 2 hours (line 66) the candle was relit and the experiment commenced again. It is noted that the curve 61 showing the inlet oxygen concentration came to an equilibrium concentration at about 12 percent whereas the dotted curve 62 showed that the concentration of oxygen in the exhaust air was tending to an equilibrium concentration of approximately 10 percent. Even though the exhaust oxygen concentration dropped below the approximate 8 percent level, as it did when the flame went out in the initial experiment, the flame did not go out when the air was being circulated because the oxygen entering the chamber was sufficiently high in concentration to sustain it. It is also noted that after the candle had extinguished itself in the initial experiment the new water was circulated in the system at about time 50 minutes, and showed a fairly rapid increase in the concentration of oxygen within the system up to just past time 1½ hours, when the system was open to the atmosphere.

As already mentioned, the experimental apparatus in FIG. 1 has supported the lives of two rats for a period of eight hours and may support a man or several men if water flow is increased. In the actual experiment oxygen was recovered from the sea water at a rate of approximately 0.1 liters per minute. A scuba diver, for example, resting in an undersea shelter might, if he had been working strenuously, require an oxygen supply thirty times greater than that; a supply only five to ten times greater should more than satisfy his average needs. Therefore, a gas exchanger column would probably have to process some 200 to 300 liters of air saturated sea water per minute to support one diver with oxygen, assuming that the same efficiency as the test unit has achieved.

Figure 3:
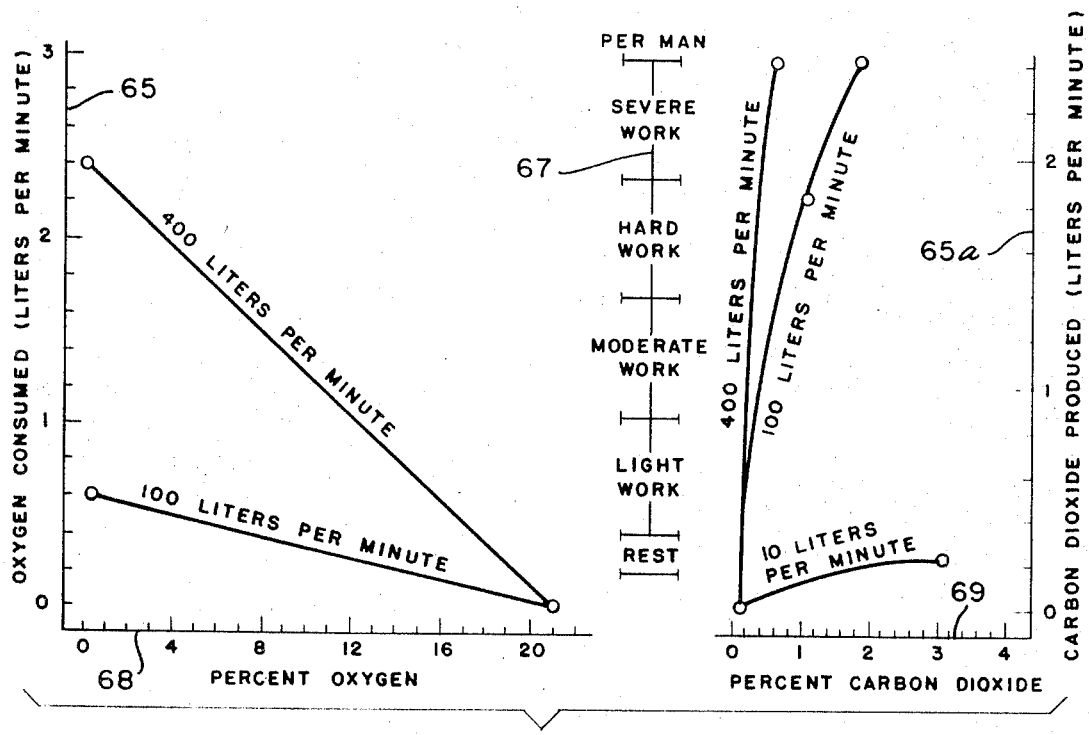
FIG. 3 shows graphs of oxygen consumed and carbon dioxide produced during different working levels of a man and indicating the flow rate of water which must be possessed to achieve a desired air atmosphere.

FIG. 3 best illustrates the concentrations of oxygen and carbon dioxide that may be maintained via the gas exchange process with sea water using apparatus as shown in FIG. 1. FIG. 3 is comprised of two graphs, the graph on the left side concerning oxygen and the graph on the right side concerning carbon dioxide. A left side ordinate 65 shows the oxygen consumed and a right side ordinate 65a shows the carbon dioxide produced during several possible work activities per man as shown by a middle ordinate 67. An abscissa of the two graphs show the percentage oxygen on the left side 68 and percentage carbon dioxide on the right side 69. The several curves drawn on each graph indicate different plots depending upon the amount of water circulated through the system per minute. It is assumed that the sea water is saturated with air and contains 6 ml. of oxygen per liter. With attention upon the left side abscissa 68, it is known that at atmosphere pressure the percentage of oxygen within the air to sustain life must be within the range from about 13 percent up to about 21 percent which is normal; the percentage of carbon dioxide allowable at atmospheric pressure is anywhere from 0 to 3 percent. However, if the pressure in a living chamber where a man is to exist is increased to 3 atmospheres (3 atmospheres pressure exists at about 65 feet in depth) then the percentage of livable oxygen in the atmosphere may be from 4 percent to about 11 percent whereas the percentage of carbon dioxide allowable in the air would be restricted from 0 to only 1 percent.

Thus, it is seen that if the pressure in the living chamber is increased the percentage of oxygen within the air supply to the man can be lowered, that is, can be "breathed down" to a lower percentage and thus a lower partial pressure may be achieved than if the stale air is scrubbed at one atmosphere pressure. It must be remembered that the lower the partial pressure of the oxygen in the stale air, the greater the differential between it and the partial pressure of the oxygen in the sea water and, therefore, the greater the tendency of the dissolved oxygen in the sea water to be transferred from the sea water to the air. However, it must also be noted that at higher pressures carbon dioxide becomes a problem since even a very small percentage (1 percent at 3 atmospheres) becomes dangerous and may become lethal. Fortunately, there is no need to worry about the partial pressures of carbon dioxide because the partial pressure of carbon dioxide in water is so low that only a small partial pressure in the stale air is needed to create the proper pressure differential. The apparatus shown in FIG. 1 may be operated at an ocean depth if the necessary valves, pumps and sealed containers are provided, all of which are well known in the art.

Since it is desirable to have man living in a chamber at a greater pressure than one atmosphere so that he may "breath down" the air, an underwater chamber which may be opened to the surrounding sea pressure is entirely feasible. Such a chamber would simply have an open bottom where the occupants could quickly go from the chamber to the water and back again without having to go through a complicated decompression process. The chamber 14 may be provided with such an open bottom. Keeping in mind the concept of partial pressures, it then becomes apparent that in a preferred embodiment the habitation or ventilated chamber may be kept at a pressure equal to or greater than one atmosphere while the means for extracting oxygen from water may be maintained at a pressure one atmosphere or lower to encourage the exchange process between the air and the water that takes place. The upper limit of pressure in the ventilated chamber may be that of the ambient sea pressure which would allow an open bottom; thus the pressure within the chamber would balance the water pressure and prevent the water from entering the chamber. The lower limit to the pressure within the means for extracting oxygen may be one-third atmosphere which would be adequate enough to encourage the removal of carbon dioxide by having it dissolve in the water. If a configuration featuring conduit 22 connecting directly with chamber 14 is desired, both chamber 14 and the gas exchanger 10 may be at equal pressures within the higher range. Referring again to FIG. 3 and using the percent oxygen figures for a depth of 65 feet, it is recalled that life may be sustained with the percent oxygen concentration between 4 percent and approximately 11 -- percent. If the man in the chamber performs moderate work and only 100 liters per minute of sea water has been circulated through the system, he will be unable to get a sufficient amount of oxygen since he will be consuming between about 1 to 1.8 liters of oxygen per minute with the system being able to replenish only 0.6 liters per minute at its maximum. At a moderate work level and a circulation rate of 400 liters per minute a sufficient amount of oxygen can be extracted from the water to replenish the oxygen which is consumed and keep the percentage of oxygen in the atmosphere above the 4 percent minimum level. On the carbon dioxide side of FIG. 3 it would be necessary to keep the percentage of carbon dioxide in the atmosphere at 1 percent or less, and at a moderate work level either the 100 liters per minute or the 400 liters per minute flow rate would be sufficient.

The apparatus shown in FIG. 1 and described above enables the performance of the following method comprising steps of conducting or moving exhaled breath of a person to water containing dissolved oxygen and bringing the breath and water together in an oxygen extraction means such as the gas exchanger 10 and air-water separator 12. Dissolved oxygen is extracted from the water and carbon dioxide is extracted from the breath, the oxygen being passed to the breath, the carbon dioxide being passed to the water. The reoxigenated, rehabilitated breath is then conducted back to the person.

FIG. 5 illustrates diagrammatically two additional embodiments of the present invention. The apparatus which is adapted to extract oxygen from sea water may be a baffled tank 70 having a sea water inlet 71 and outlet 72, a stale air inlet conduit 74 and an oxygenated air outlet conduit 76. Conduits 74 and 76 communicate with living chamber 77 which is adapted to exclude water and provide a space for confining a person's exhaled breath. One embodiment of the invention would entail the method of circulating sea water through the baffled tank 70 and then introducing stale air from chamber 77 in which the oxygen consuming device is located. The stale air is bubbled through the baffled tanks and through the stream of sea water in a countercurrent manner, before being removed through outlet 76 as reoxygenated air and conducted to the chamber 77 for use. The bubbling of air through water enables the transfer process of oxygen and carbon dioxide to occur by having a thorough mixing of the sea water and stale air or exhaled breath. Pressure meter 78 indicates the pressure in the baffled tank. To operate the FIG. 5 apparatus underwater valves 73a, 73b, 75a and 75b may be located as shown. The method of operation may be as follows: valve 73a is opened, valves 73b, 75a and 75b are closed, a charge of sea water is pumped through inlet 71 into tank 70. Valve 73a is then closed. Valves 75a and 75b are opened equalizing the pressures of the charge of water and the air in the chamber 77. The stale air is pumped from chamber 77 being conducted through conduit 74 and bubbled through the tank and then conducted back to chamber 77 through conduit 76. As the stale air passes through the water filled tank, the oxygen, carbon dioxide transfer process occurs rehabilitating the stale air. Valves 75a and 75b are then closed and valve 73b opened so that the charge of sea water may be pumped out through outlet 72 back to the sea. An apparatus containing several of the tanks 70 and related conduits, valves and pumps could achieve a continuous circulation of reoxygenated air to chamber 77.

Another embodiment, using the FIG. 5 configuration, also requires sea water to be pumped into the baffled tank 70 through inlet 71 and open valve 73a. All valves are then closed, pressure in the tank 70 is lowered such that if a sufficient amount of heat is added to the tank the sea water will begin to boil. Steam is injected at steam inlet 80 causing the sea water to boil which enables the dissolved air to be released and bubbled upward through the tank to conduit 76. Additional air is realized through the bubbling action. Valve 75a is then opened to allow the air to pass to the chamber 77. Stale air may then be bubbled through the water and dissolved, thereby removing it from the chamber.

The FIG. 4 apparatus is still another embodiment for deep sea oxygen extraction from sea water. This system comprises a tank 82 which is adapted to be filled with sea water, a pump means which may be a vacuum pump 94 to reduce the pressure in the tank 82 and thereby cause air to be driven from the water, expansion chamber 90 for removing the extra amount of water engendered by the lessening of the pressure upon the water, means to agitate the water in the tank which may be pump 96 and conduit 91 and part of the air driven off by reducing pressure upon the water, conduit means and pump means which may be conduit 93 and pump 94, respectively, for connecting the tank 82 and an undersea chamber 84 and for moving the air driven off from the tank to the chamber, pump 100 and conduit 101 for removing stale air from the chamber 84, pump means such as pump 104 and conduit means such as conduit 105 for moving the stale air to the tank 82 and bubbling the stale air through the water, expansion chamber 102 for automatically regulating pressure in the conduits 101 and 105 and various valves 86a, 86b, 88a, 88b, 98a and 98b for allowing operation of individual parts of the system in sequenced stages. A high pressure pump 92 may be provided to remove the extra water from tank 82 and expansion chamber 90. The system operates as follows: during stage 1, valves 86a and 86b are opened simultaneously and a sea water charge from the ocean is received by tank 82 displacing the "used" sea water from the previous cycle. The used sea water must be returned to a surrounding environment which is at a very high pressure; however, little energy is required because the incoming fresh charge helps to remove the used water, a principle embodied in U.S. Pat. No. 3,295,454 issued Jan. 3, 1967 to Plum and Vind and entitled "Pressure Reducing Pumping System."

Valves 86a and 86b are then closed and stage 2 begins by opening valves 88a and 88b. The water in tank 82 expands slightly because of the reduced pressure in the system causing the water level in expansion chamber 90 to rise. The high pressure pump 92 is employed to remove the extra sea water and thus maintain the water level in expansion chamber 90 at a substantially constant level. In order to maintain a constant water level in the expansion chamber 90 at a depth of 600 feet, it would be necessary for pump 92 to remove about 1 gallon of sea water for every 1000 gallons processed; this is the only pumping against the hydrostatic pressure of the ocean that will be required by this particular embodiment. The vacuum pump 94 subjects the sea water in both the tank 82 and the expansion chamber 90 to a vacuum; the air that is dissolved in the sea water will be driven off and then come to the surface in the form of small bubbles; at the same time pump 96 is employed to circulate some of the air driven off through the conduit 91, the tank 82, and expansion chamber 90 to agitate the sea water and cause more dissolved air to be driven from the sea water. Since an equal number of air molecules leave and enter the water at the air-water interface under equilibrium conditions, a change in that condition, i.e., a reduction in pressure, causes many of those molecules escaping the water to collide with air molecules above the water and thereby sending itself or another molecule back into the water. Those molecules not colliding may be collected for use in chamber 84. Pump 94 also proceeds to remove the air taken from the sea water and conduct it though conduit 93 to the chamber 84 for use therein.

Stage 3 begins by closing the valves 88a and 88b and opening valves 98a and 98b. Exhaled breath and other stale air from the undersea chamber 84 are removed by pump 100 and conducted through conduits 101 and 105 to tank 82 for bubbling through the sea water. Pump 104 may be required to help pump the stale air in the bubbling process. The quantity of air that is dissolved within the sea water is automatically controlled in the invention by having expansion chamber 102 within the circuit. If air should not dissolve in the sea water as rapidly as it is removed from the chamber 84, the pressure in chamber 102 begins to rise. If the pressure in the system begins to rise air will commence to dissolve more rapidly into the sea water since the higher the pressure the greater the dissolving ability of air into water, i.e., the reverse molecule process of that explained above. At the end of stage 3 the process has been completed and the apparatus is ready to start a new process by having valves 98a and 98b close and valves 86a and 86b open so that a fresh charge of sea water may be brought in and the "used" sea water may be discharged. A system may be constructed wherein three such tanks 82 are involved with each tank in one of the three stages just described. Such a system would have a continuously circulating system of fresh air being pumped into the chamber 84 with a corresponding removal of the stale air.

Obviously many modifications and variations of the present invention are possible in the light of the above teachings. It is therefore to be understood that within the scope of the appended claims the invention may be practiced otherwise than as specifically described.

I claim:

1. The method of supplying air from source water comprising the steps of:
   maintaining the air pressure within a breathing chamber within a range including ambient sea pressure as an upper limit when the chamber is within the ocean and about one atmosphere as a lower limit regardless of the location of the chamber;
   passing both stale air from the chamber and the source water into a gas exchanger for causing therein intimate and agitated air and water contact,
   passing the air and water from said exchanger into an air-water separator,
   separating the air and water in said separator,
   maintaining air pressure within the exchanger and separator within a range including 1 atmosphere as an upper limit and 1/3 atmosphere as a lower limit, and
   conducting the separated air back to said breathing chamber and discharging the source water.

2. An apparatus for supplying air from water comprising:
   a venturi injector for receiving water and stale air;
   a gas exchanger connected to said venturi injector for receiving and mixing said stale air and water;
   an air-water separator for separating the resulting water and air;
   conduit and pump means for connecting said gas exchanger and air-water separator and causing said mixture of water and air to move from said gas exchanger to said air-water separator;
   a ventilated chamber for receiving and using the resulting air;
   conduit and pump means connecting said ventilated chamber and said air-water separator for causing said resulting air to move from said air-water separator to said ventilated chamber; and
   conduit means for connecting said ventilated chamber and said venturi injector.

3. The apparatus of claim 2 wherein said separator includes baffle means directing the flow of the water to promote escape of entrained air, said apparatus further including effluent pump and conduit means for said separator.

* * * * *